United States Patent
Kooiman et al.

(10) Patent No.: US 10,450,054 B2
(45) Date of Patent: Oct. 22, 2019

(54) ADHESIVELY JOINING AIRFRAME MEMBERS AT SOLID INSERT

(71) Applicant: Bell Helicopter Textron Inc., Fort Worth, TX (US)

(72) Inventors: James Everett Kooiman, Fort Worth, TX (US); George Ryan Decker, Fort Worth, TX (US); Keith Alan Stanney, Fort Worth, TX (US); Robert Mark Chris, Fort Worth, TX (US)

(73) Assignee: Bell Textron Inc., Fort Worth, TX (US)

(*) Notice: Subject to any disclaimer, the term of this patent is extended or adjusted under 35 U.S.C. 154(b) by 325 days.

(21) Appl. No.: 15/601,658

(22) Filed: May 22, 2017

(65) Prior Publication Data

US 2017/0259904 A1    Sep. 14, 2017

Related U.S. Application Data

(63) Continuation-in-part of application No. 15/424,095, filed on Feb. 3, 2017.

(60) Provisional application No. 62/292,718, filed on Feb. 8, 2016.

(51) Int. Cl.
*B64C 3/26* (2006.01)
*B64C 3/18* (2006.01)
*B64C 29/00* (2006.01)

(52) U.S. Cl.
CPC ............... *B64C 3/26* (2013.01); *B64C 3/187* (2013.01); *B64C 29/0033* (2013.01)

(58) Field of Classification Search
CPC ............ B64C 3/187; B64C 3/26; B64C 1/064
See application file for complete search history.

(56) References Cited

U.S. PATENT DOCUMENTS

| | | | |
|---|---|---|---|
| 3,020,986 A | | 2/1962 | Kirk et al. |
| 4,416,349 A | * | 11/1983 | Jacobs ................. G10K 11/16 181/208 |
| 4,902,180 A | * | 2/1990 | Gauron ................. B29C 65/42 411/258 |
| 6,789,367 B1 | | 9/2004 | Dando |
| 8,955,290 B2 | * | 2/2015 | Saff ........................ B32B 3/06 52/783.1 |
| 9,015,941 B2 | | 4/2015 | Thiagarajan et al. |

(Continued)

OTHER PUBLICATIONS

European Search Report; Application No. 17209541.6; European Patent Office; dated Mar. 2, 2018.

*Primary Examiner* — Philip J Bonzell
*Assistant Examiner* — Tye William Abell
(74) *Attorney, Agent, or Firm* — Lawrence Youst PLLC

(57) ABSTRACT

An airframe assembly for an aircraft. The airframe assembly includes a first airframe member having a first skin, a second skin, a large cell core joined between the first and second skins and a solid insert having a side surface. The solid insert is joined between the first and second skins such that at least a portion of the side surface is adjacent to the large cell core. The first skin has a first surface disposed opposite the solid insert. The airframe assembly also includes a second airframe member having a second surface. An adhesive joint is disposed between the first and second surfaces structurally bonding the first airframe member to the second airframe member such that the second airframe member is positioned opposite the solid insert.

21 Claims, 12 Drawing Sheets

(56) References Cited

U.S. PATENT DOCUMENTS

| | | | |
|---|---|---|---|
| 2004/0011927 A1* | 1/2004 | Christman | B29C 65/00 244/131 |
| 2004/0055248 A1 | 3/2004 | Grillos | |
| 2008/0128553 A1* | 6/2008 | Brown | B64C 1/26 244/124 |
| 2010/0162567 A1 | 7/2010 | Kirkwood et al. | |
| 2013/0026297 A1* | 1/2013 | McCullough | B29D 99/001 244/131 |
| 2014/0061385 A1 | 3/2014 | Dan-Jumbo | |
| 2015/0336368 A1* | 11/2015 | Ross | F16B 11/008 156/253 |

* cited by examiner

ADHESIVELY JOINING AIRFRAME MEMBERS AT SOLID INSERT

CROSS-REFERENCE TO RELATED APPLICATIONS

This patent application is a continuation-in-part of copending U.S. application Ser. No. 15/424,095, filed Feb. 3, 2017, which claims the benefit of the filing date of U.S. Provisional Patent Application No. 62/292,718, filed Feb. 8, 2016, both of which are hereby incorporated by reference.

TECHNICAL FIELD OF THE DISCLOSURE

The present disclosure relates, in general, to airframe members formed from lightweight, high stiffness structural panels and, in particular, to airframe members formed from large cell core stiffened panels having solid inserts at load points that provide joining locations for coupling the airframe members with other airframe structures.

BACKGROUND

The airframes of modern aircraft are constructed from a wide variety of materials, including steel, aluminum and composites. While most airframe components are made from strong, rigid materials, in order to conserve weight, certain airframe components are made from relatively thin material layers attached to stiffening structures such as stringers. For example, the wing of a conventional tiltrotor aircraft includes a torque box structure formed from an upper skin, a lower skin, a forward spar and an aft spar. The upper and lower skins have stringers attached thereto that extend generally parallel with the longitudinal axis of the wing to provide stiffness and support to the skins. The stringers may have an I-beam cross section and are typically connected to the interior surface of the skins at reinforcement strips that provide support for the skins against catastrophic buckling, help to maintain the shape and contour of the skins, provide stiffness at the stringer load points and distribute pressure into the skins. In addition, the torque box structure typically includes multiple internal support members that provide horizontal structural strength to the forward and aft spars and the upper and lower skins.

It has been found, however, that the assembly of the torque box structure for conventional tiltrotor aircraft wings is complex and requires very tight tolerances. For example, the installation of numerous fasteners to the skins and other structural components is difficult and time consuming due to limited access to small interior spaces and complicated sealing requirements. Also, once the structural members are assembled, numerous foam details must be positioned between the structural members in the fuel bays to provide a smooth, ramped surface for the fuel components housed therein. In addition, it has been found, that the thickness of stringers as well as the multiple internal support members reduce the space available for fuel and other internal systems within the torque box structure.

SUMMARY

In a first aspect, the present disclosure is directed to a core stiffened panel that includes a first skin and a second skin. A large cell core is joined between the first and second skins. A solid insert having a side surface is also joined between the first and second skins such that at least a portion of the side surface is adjacent to the large cell core.

In some embodiments, the large cell core is joined to the adjacent portion of the side surface of the solid insert. In certain embodiments, the large cell core may be formed from an array of cells having a width of between about 0.5 inches and about 1.5 inches and a thickness of between about 0.25 inches and about 0.75 inches. In some embodiments, the large cell core may be a large cell composite core such as a large cell carbon core. In certain embodiments the first skin, the second skin and the solid insert may be formed from a composite materials such as a carbon composite material such that the first skin, the second skin and the solid insert have generally matching coefficients of thermal expansion.

In some embodiments, the large cell core and the solid insert may be structurally bonded between the first and second skins and/or the large cell core may be structurally bonded to the adjacent portion of the side surface of the solid insert. In certain embodiments, the solid insert extends between first and second ends of at least one of the first and second skins. In other embodiments, the solid insert may be surrounded by the large cell core. In some embodiments, a plurality of solid inserts may be joined between and/or structurally bonded to the first and second skins. In certain embodiments, the solid insert may be a symmetrical solid insert, a non symmetrical solid insert and/or a solid insert with a void therein. In certain embodiments, the first skin, the solid insert and the second skin may include at least one opening extending therethrough.

In a second aspect, the present disclosure is directed to a method of forming a core stiffened panel. The method includes providing a first skin; disposing a large cell core on the first skin; locating a solid insert having a side surface on the first skin such that at least a portion of the side surface is adjacent to the large cell core; positioning a second skin on the large cell core and the solid insert opposite the first skin to form a panel assembly; and curing the panel assembly to join the large cell core to the first and second skins and to join the solid insert to the first and second skins, thereby forming the core stiffened panel.

The method may also include joining the large cell core to the solid insert; structurally bonding the large cell core to the first and second skins; structurally bonding the solid insert to the first and second skins; surrounding the solid insert with the large cell core; locating a plurality of solid inserts on the first skin and joining each of the solid inserts to the first and second skins and/or forming at least one opening extending through the first skin, the solid insert and the second skin.

In a third aspect, the present disclosure is directed to an airframe assembly for an aircraft. The airframe assembly includes a first airframe member having a first skin, a second skin, a large cell core joined between the first and second skins and a solid insert having a side surface. The solid insert is joined between the first and second skins such that at least a portion of the side surface is adjacent to the large cell core. The first skin has a first surface disposed opposite the solid insert. The airframe assembly also includes a second airframe member having a second surface. An adhesive joint is disposed between the first and second surfaces structurally bonding the first airframe member to the second airframe member such that the second airframe member is positioned opposite the solid insert.

In a fourth aspect, the present disclosure is directed to a wing assembly for an aircraft. The wing assembly includes a wing skin having an inner skin member, an outer skin member, a large cell core joined between the inner and outer skin members and a solid insert having a side surface. The solid insert is joined between the inner and outer skin members such that at least a portion of the side surface is adjacent to the large cell core. The inner skin member has a first surface disposed opposite the solid insert. The wing assembly also includes a rib having a second surface. An adhesive joint is disposed between the first and second surfaces structurally bonding the rib to the inner skin member of the wing skin such that the rib is positioned opposite the solid insert.

In a fifth aspect, the present disclosure is directed to an aircraft. The aircraft includes a first airframe member having a first skin, a second skin, a large cell core joined between the first and second skins and a solid insert having a side surface. The solid insert is joined between the first and second skins such that at least a portion of the side surface is adjacent to the large cell core. The first skin has a first surface disposed opposite the solid insert. The airframe assembly also includes a second airframe member having a second surface. An adhesive joint is disposed between the first and second surfaces structurally bonding the first airframe member to the second airframe member such that the second airframe member is positioned opposite the solid insert.

In a sixth aspect, the present disclosure is directed to an airframe assembly for an aircraft. The airframe assembly includes a first airframe member having a first skin, a second skin, a large cell core joined between the first and second skins and a solid insert having a side surface. The solid insert is joined between the first and second skins such that at least a portion of the side surface is adjacent to the large cell core. The first airframe member has a first set of openings extending through the first skin, the solid insert and the second skin. The airframe assembly also includes a second airframe member having a second set of openings operable to be aligned with the first set of openings of the first airframe member. Each of a plurality of fasteners extends through one of the openings of the first set of openings and one of the openings of the second set of openings securably coupling the first airframe member to the second airframe member.

In a seventh aspect, the present disclosure is directed to a wing assembly for an aircraft. The wing assembly includes a wing skin having an inner skin member, an outer skin member, a large cell core joined between the inner and outer skin members and a solid insert having a side surface. The solid insert is joined between the inner and outer skin members such that at least a portion of the side surface is adjacent to the large cell core. The wing skin has a first set of openings extending through the inner skin member, the solid inset and the outer skin member. The wing assembly also includes a rib having a second set of openings operable to be aligned with the first set of openings of the wing skin. Each of a plurality of fasteners extends through one of the openings of the first set of openings and one of the openings of the second set of openings securably coupling the rib to the wing skin.

In an eighth aspect, the present disclosure is directed to an aircraft. The aircraft includes a first airframe member having a first skin, a second skin, a large cell core joined between the first and second skins and a solid insert having a side surface. The solid insert is joined between the first and second skins such that at least a portion of the side surface is adjacent to the large cell core. The first airframe member has a first set of openings extending through the first skin, the solid insert and the second skin. The airframe assembly also includes a second airframe member having a second set of openings operable to be aligned with the first set of openings of the first airframe member. Each of a plurality of fasteners extends through one of the openings of the first set of openings and one of the openings of the second set of openings securably coupling the first airframe member to the second airframe member.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
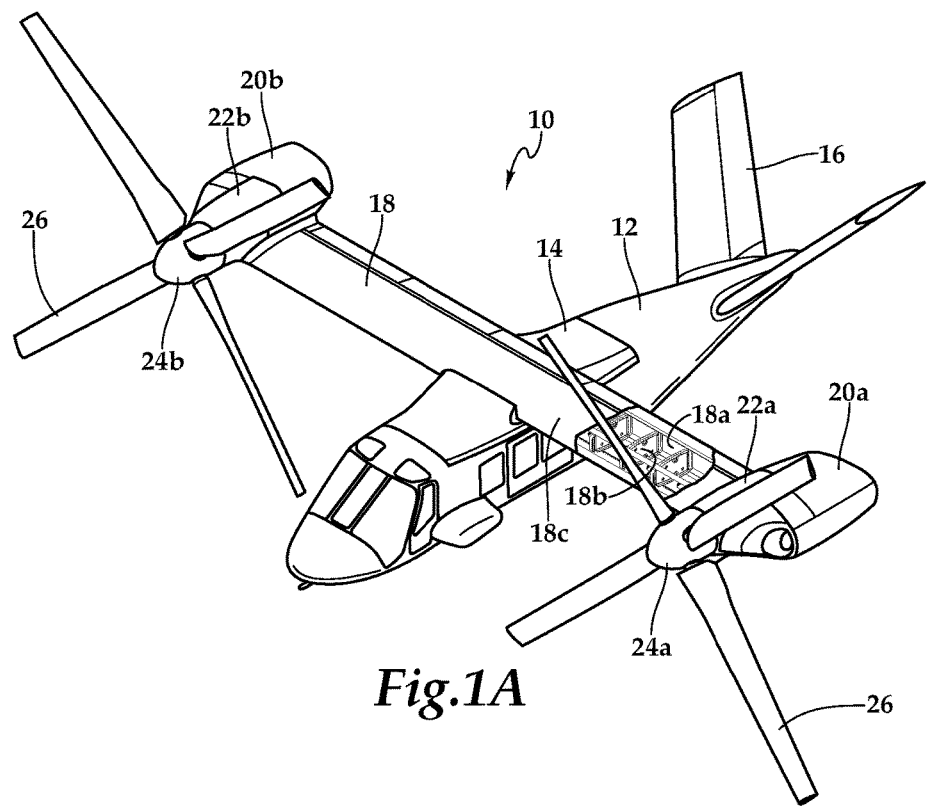
FIGS. 1A-1B are schematic illustrations of a tiltrotor aircraft in a forward flight mode and in a vertical takeoff and landing flight mode, respectively, in accordance with embodiments of the present disclosure.
Figure 1B:
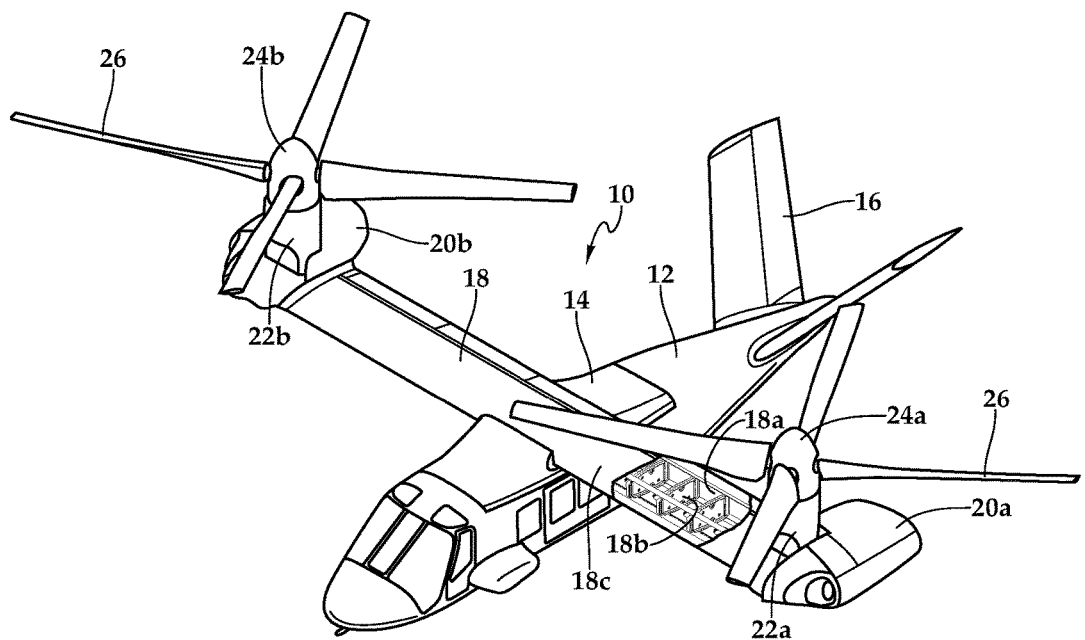

Referring to FIGS. 1A-1B in the drawings, a tiltrotor aircraft is schematically illustrated and generally designated 10. Aircraft 10 includes a fuselage 12, a wing mount assembly 14 that is rotatable relative to fuselage 12 and a tail assembly 16 having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs and skins such as aft wing spar 18a, wing ribs 18b and upper wing skin 18c, may be considered to be the airframe of tiltrotor aircraft 10. In the illustrated embodiment, the wing skins include large cell core stiffened panels having solid inserts at various load points that provide joining locations for wing ribs 18b.

Located proximate the outboard ends of wing 18 are fixed nacelles 20a, 20b, each of which preferably houses an engine and a fixed portion of a drive system. A pylon assembly 22a is rotatable relative to fixed nacelle 20a and wing 18 between a generally horizontal orientation, as best seen in FIG. 1A, a generally vertical orientation, as best seen in FIG. 1B. Pylon assembly 22a includes a rotatable portion of the drive system and a proprotor system 24a that is rotatable responsive to torque and rotational energy provided via the engine and drive system. Likewise, a pylon assembly 22b is rotatable relative to fixed nacelle 20b and wing 18 between a generally vertical orientation, as best seen in FIG. 1A, a generally horizontal orientation, as best seen in FIG. 1B. Pylon assembly 22b includes a rotatable portion of the drive system and a proprotor system 24b that is rotatable responsive to torque and rotational energy provided via the engine and drive system. In the illustrated embodiment, proprotor systems 24a, 24b each include four proprotor blades 26. It should be understood by those having ordinary skill in the art, however, that proprotor assemblies 24a, 24b could alternatively have a different number of proprotor blades, either less than or greater than four. In addition, it should be understood that the position of pylon assemblies 22a, 22b, the angular velocity or revolutions per minute (RPM) of the proprotor systems 24a, 24b, the pitch of proprotor blades 26 and the like are controlled by the pilot of tiltrotor aircraft 10 and/or the flight control system to selectively control the direction, thrust and lift of tiltrotor aircraft 10 during flight.

FIG. 1A illustrates tiltrotor aircraft 10 in a forward flight mode or airplane flight mode, in which proprotor systems 24a, 24b are positioned to rotate in a substantially vertical plane to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor systems 24a, 24b are positioned to rotate in a substantially horizontal plane to provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor systems 24a, 24b positioned between airplane flight mode and helicopter flight mode, which can be referred to as conversion flight mode.

Preferably, each fixed nacelle 20a, 20b houses a drive system, such as an engine and transmission, for supplying torque and rotational energy to a respective proprotor system 24a, 24b. In such embodiments, the drive systems of each fixed nacelle 20a, 20b may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 24a, 24b via one or more drive shafts located in wing 18. In tiltrotor aircraft having both nacelle and fuselage mounted drive systems, the fuselage mounted drive system may serve as a backup drive system in the event of failure of either or both of the nacelle mounted drive systems.

Figure 2:
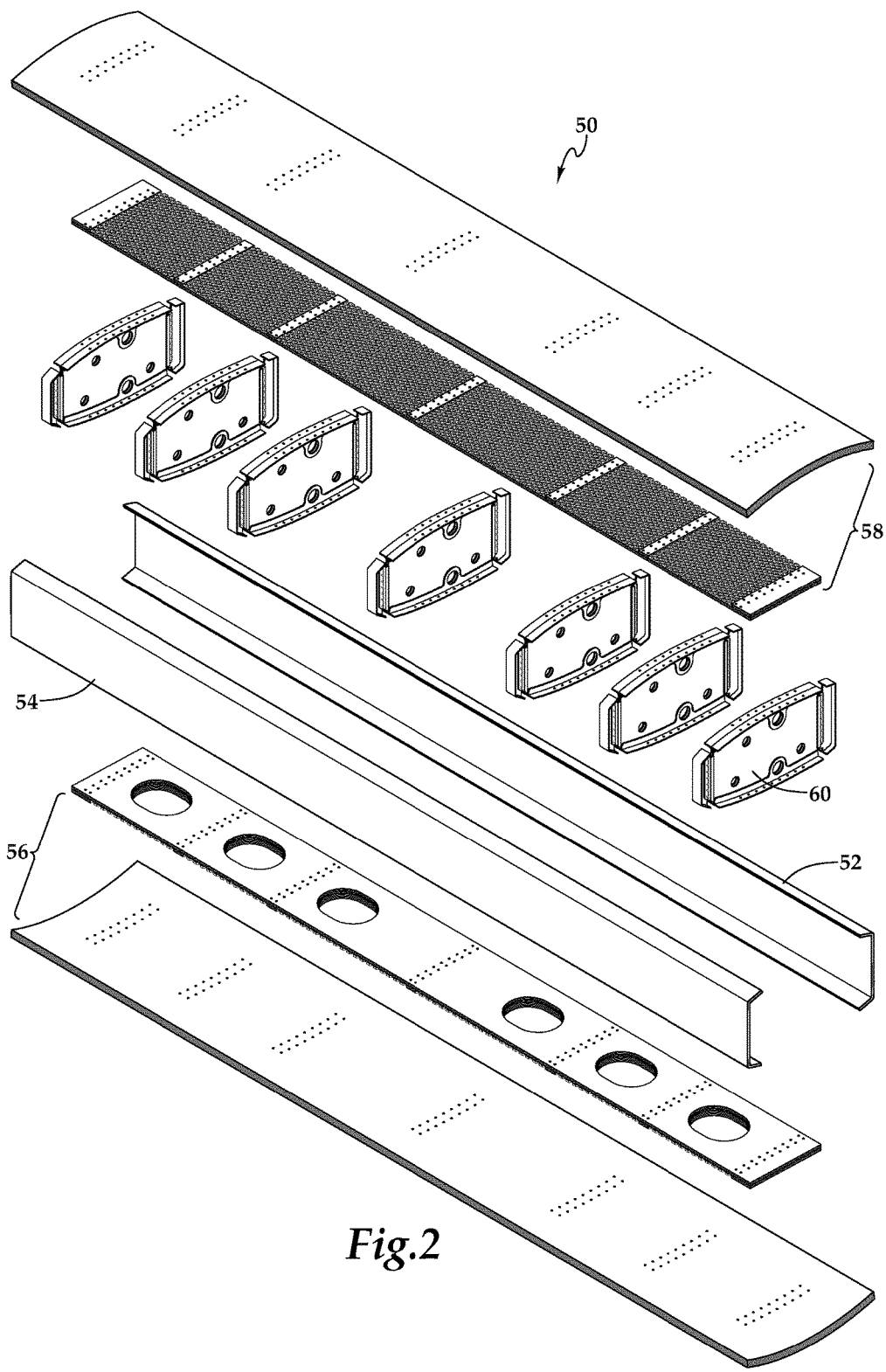
FIG. 2 is an exploded view of a torque box structure of a wing of a tiltrotor aircraft in accordance with embodiments of the present disclosure.
Figure 3:
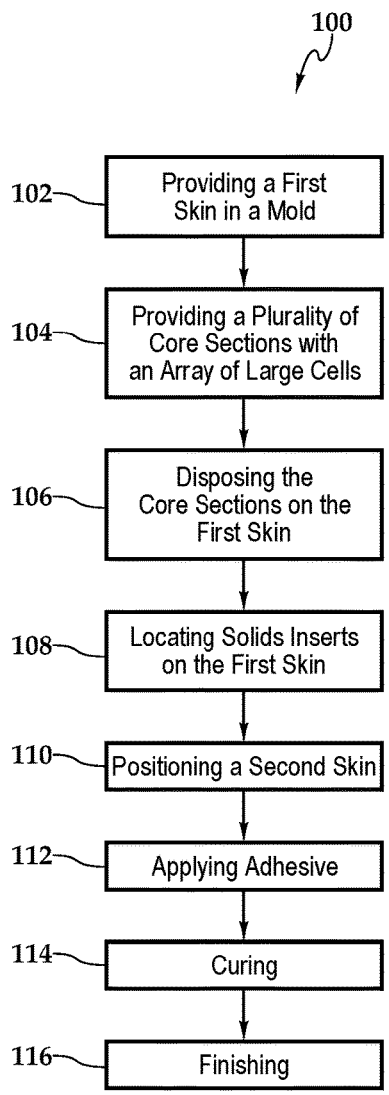
FIG. 3 is a flow diagram of a method of manufacturing a large cell core stiffened panel having solid inserts in accordance with embodiments of the present disclosure.

Referring next to FIG. 2 of the drawings, an exploded view of a torque box structure of wing 18 of tiltrotor aircraft 10 is depicted. Torque box structure 50 includes an aft spar 52, a forward spar 54, a lower skin assembly 56 including an outer skin member and an inner skin member with a large cell core and solid inserts joined therebetween, an upper skin assembly 58 including an outer skin member and an inner skin member with a large cell core and solid inserts joined therebetween, and a plurality of ribs 60. The various torque box components are may joined together by adhesive bonding or using aerospace fasteners such as pins, screws, rivets or other suitable fastening means to form torque box structure 50.

Various structural components of the an airframe such the outer and inner skin members, spars, ribs and the like may be formed from composite materials that may include numerous material plies composed of continuous filaments or fibers including one or more of glass, carbon, graphite, basalt, aromatic polyamide materials or the like and any combination thereof. The material plies may be in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. Even though the methods of manufacture, the composites, the components and the subassemblies thereof are described herein in the context of a tiltrotor aircraft, it should be understood by those having ordinary skill in the art that the methods of manufacture, the composites, the components and the subassemblies thereof can be implemented on other aircraft including manned and unmanned aircraft.

In one example, the various airframe components may be formed using a layup process wherein a plurality of plies, which may be preimpregnated with an uncured resin, are placed in a mold or other support structure. The plies may have the same or different shapes, may be the same or different materials, may have the same or different fabric weaves, may have the same or different thicknesses, may be continuous or discontinuous, may extend beyond the periphery of the mold or be fully contained within the mold, may be oriented in the same or different directions and/or may have other similarities or differences. In one embodiment, the plies may be an intermediate modulus epoxy resin impregnated carbon fiber fabric that is stiffer than conventional composite fabrics, thereby allowing for fewer plies and reducing the weight and manufacturing cost. Each fabric layer is considered a ply of the laminate with the total number of plies ranging from between about 8 plies to about 100 plies for an outer skin member of a wing skin. In other airframe implementations, the total number of plies may be between about 10 plies to about 20 plies, between about 20 plies to about 30 plies, between about 20 plies to about 60 plies, between about 40 plies to about 60 plies and/or other suitable range or number of plies.

Following layup of the plies, the plies may be compacted to remove any pockets of air and to provide adequate attachment therebetween. The compacting step can be achieved by applying a vacuum to the plies in the mold or by pressing a second mold member on the plies. After the plies are compacted, the plies may be cured to form a laminate by heating the plies for two hours at 350 degrees Fahrenheit and at 90 psi, for example. Following the curing process, the laminate may be trimmed or otherwise machined as desired. This and/or similar processes may be used to form various components or subassemblies thereof for torque box structure 50 includes aft spar assembly 52, forward spar assembly 54, ribs 60 and/or the outer and inner skin members of lower skin assembly 56 and upper skin assembly 58.

Figure 5A:
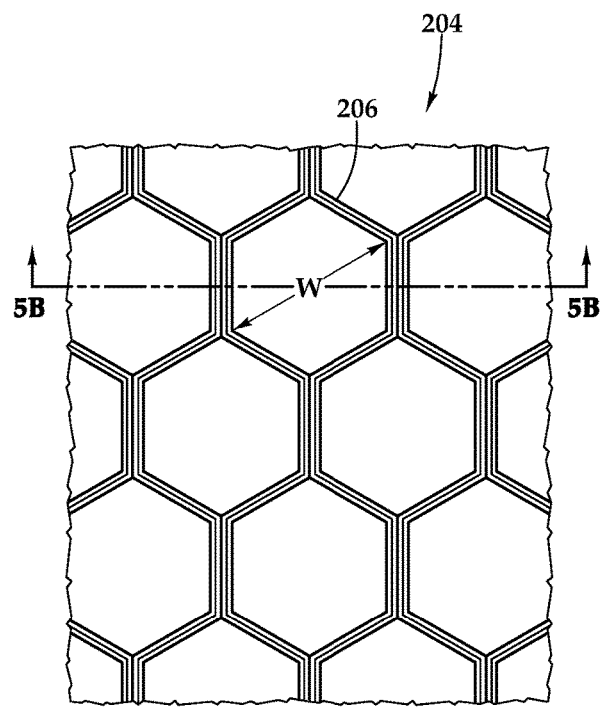
FIGS. 5A-5B are top and cross sectional views of a large cell core for use in a large cell core stiffened panel having solid inserts in accordance with embodiments of the present disclosure.
Figure 5B:
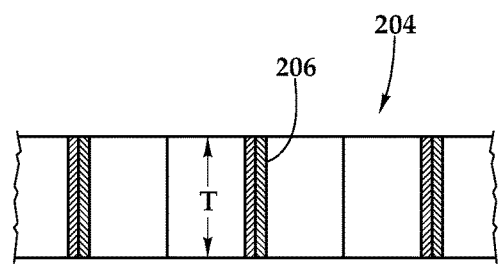
Figure 4A:
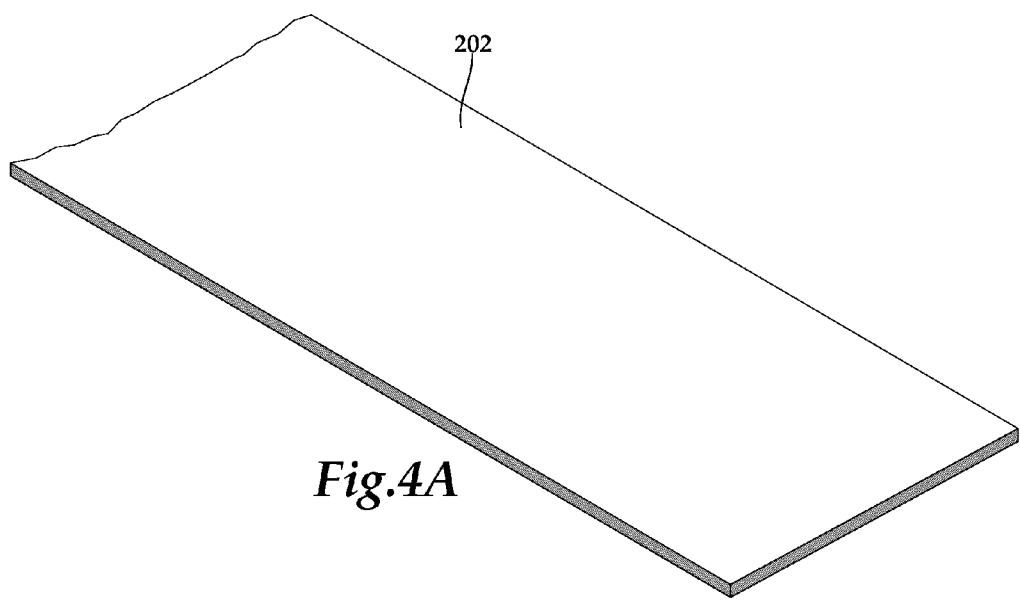
FIGS. 4A-4F are schematic illustrations of a method of manufacturing a large cell core stiffened panel having solid inserts in accordance with embodiments of the present disclosure.

Referring next to FIGS. 3 and 4A-4F, manufacturing steps associated with forming a lower wing skin assembly for a torque box structure of tiltrotor aircraft 10 will now be described. In step 102 of method 100, a first skin 202, as best seen in FIG. 4A, is placed in a mold or other secure structure (not pictured). First skin 202 is preferably a laminate formed from a plurality of material plies as discussed herein. In step 104, a plurality of large cell core sections 204 are provided. Large cell core sections 204 may be in the form of large cell honeycomb structures, wherein the term "honeycomb" means a material comprising a plurality of interconnected cell walls that define a plurality of cells. The cells may take the form of hexagonal cells, rectangular cells, square cells, flex-core cells, reinforced cells or the like. The term "large cell," for the purposes of this disclosure, means that each cell 206 has a width W of at least 0.5 inches (see FIG. 5A). For example, the width W of the large cells may be between about 0.5 inches and about 1.5 inches and preferably about 1 inch. The thickness T of the large cells may be between about 0.25 inches and about 0.75 inches and preferably about 0.5 inches (see FIG. 5B). Even though particular width and thickness dimensions have been described for the cells of large cell core sections 204, those having ordinary skill in the art will recognize that cells having other dimensions both larger and smaller than those described are possible and are considered to be within the scope of the present disclosure.

Large cell core sections 204 may be formed from a variety of materials, including but not limited to, composite materials and metals. For example, the walls of large cell core sections 204 may be made from one or more material plies oriented in one or more directions and can be woven, unwoven or braided, for example. Large cell core sections 204 may be made of resin impregnated filaments or fibers composed of one or more of glass, carbon, graphite, basalt, aromatic polyamide materials or the like and any combination thereof. The resin may be a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. Each large cell core section 204 may be cut or machined to any suitable size or shape including the illustrated rectangular shape. In the illustrated embodiment, each large cell core section 204 is constructed of similar material, shape and size but, in other embodiments, the plurality of large cell core sections 204 may include a variety of large cell core sections 204 having at least one different material, shape or size as compared to the other large cell core sections 204.

Figure 4B:
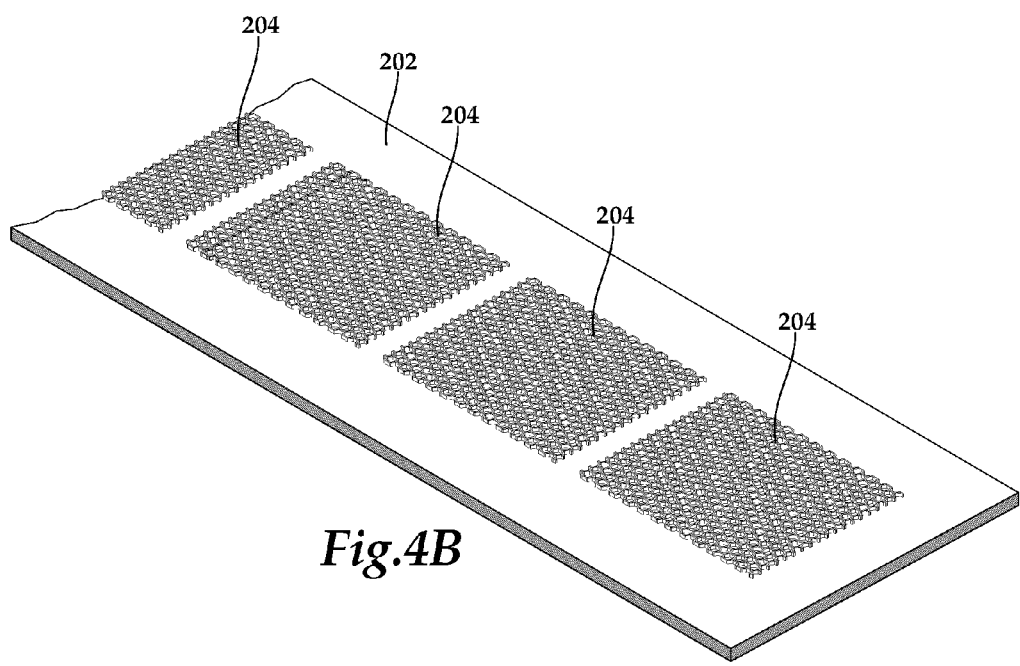

In step 106, the plurality of large cell core sections 204 are disposed on first skin 202, as best seen in FIG. 4B. In the illustrated embodiment, large cell core sections 204 are positioned generally along the longitudinal axis of first skin 202 within the periphery of first skin 202. In other embodiments, a single large cell core section 204 may extend spanwise across the entire length of first skin 202.

Figure 4C:
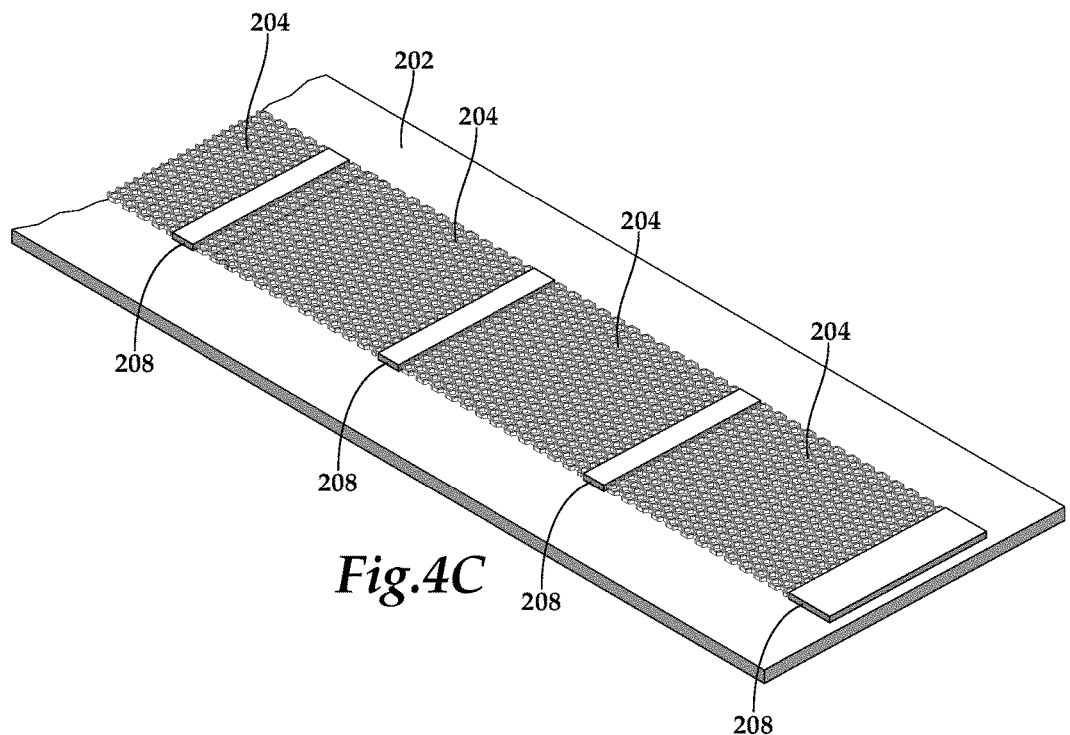

In step 108, a plurality of solid inserts 208 are located on first skin 202 such that at least a portion of a side surface of each solid insert 208 is adjacent to at least one of the large cell core sections 204, as best seen in FIG. 4C. Solid inserts 208 may be formed from a variety of materials, including but not limited to, composite materials and metals. For example, solid inserts 208 may include numerous material plies composed of continuous filaments or fibers including one or more of glass, carbon, graphite, basalt, aromatic polyamide materials or the like and any combination thereof. Solid inserts 208 may include material plies in the form of fabrics such as woven fabrics, tape such as unidirectional tape and the like. The plies may be joined together with a resin such as a polymeric matrix including thermoplastic or thermosetting resin or any suitable resin system such as epoxies, polyimides, polyamides, bismaleimides, polyesters, vinyl esters, phenolics, polyetheretherketones (PEEK), polyetherketones (PEK), polyphenylene sulfides (PPS) and the like. Each solid insert 208 may be cut or machined to any suitable size or shape including the illustrated rectangular shape. Each solid insert 208 may alternatively be a compression molded material that is molded in the desired shape. For example, the compression molded material can be a curable moldable material, such as thermosetting resins and advanced composite thermoplastics with unidirectional tapes, woven fabrics, randomly orientated fiber mat or chopped strand. Solid inserts 208 may be butt jointed to the adjacent large cell core sections 204 using a foaming adhesive or other suitable jointing method, if desired. Regardless of the selected materials or processes, first skin 202, solid inserts 208 and second skin 210 preferably have generally matching coefficients of thermal expansion.

Figure 4D:
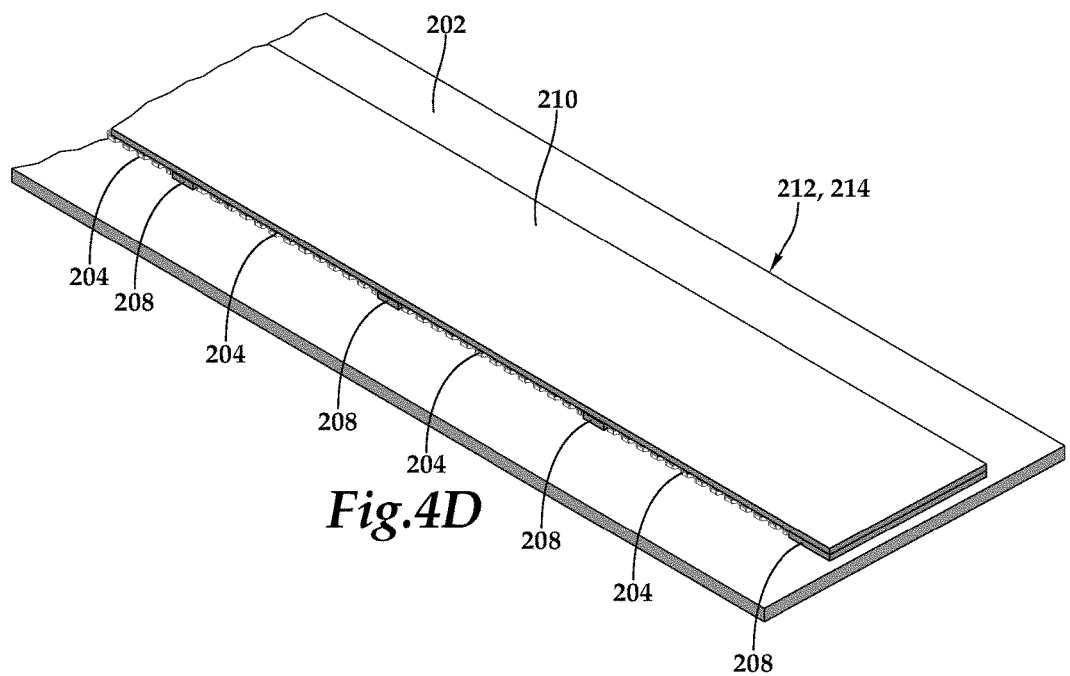

In step 110, second skin 210 is positioned onto solid inserts 208 and large cell core sections 204, as best seen in FIG. 4D. In the illustrated embodiment, second skin 210 is a laminate formed from the same materials and processes as first skin 202. In other embodiments, however, second skin 210 could be formed from other materials and by other processes. In the illustrated embodiment, second skin 210 is aligned with the outer edges of solid inserts 208 and large cell core sections 204. In other embodiments, second skin 210 could have a different length and/or width then solid inserts 208 and/or large cell core sections 204.

In step 112, one or more adhesives or adhesive layers are applied to the upper surface of large cell core sections 204, the lower surface of large cell core sections 204, the upper surface of solid inserts 208, the lower surface of solid inserts 208, the upper surface of first skin 202 and/or the lower surface of second skin 210. This step may take place at any suitable interval or intervals between step 102 and step 110 such that the adhesive is disposed between the lower surface of large cell core sections 204 and first skin 202, the lower surface of solid inserts 208 and first skin 202, the upper surface of large cell core sections 204 and second skin 210 as well as the upper surface of solid inserts 208 and second skin 210. In the illustrated embodiment, the adhesive may be reticulated to provide fillets of adhesive between first skin 202, large cell core sections 204 and second skin 210. At this stage, first skin 202, large cell core sections 204, solid inserts 208 and second skin 210 may be referred to as a panel assembly 212 and/or an uncured panel assembly.

In step 114, panel assembly 212, which may be represent by FIG. 4D, is cured under heat and pressure. For example, panel assembly 212 may be cured for about 2 hours at 250 degrees Fahrenheit at a pressure above ambient pressure, depending upon the adhesive or adhesives being cured. Following the curing step, large cell core sections 204 are joined between first skin 202 and second skin 210 and are preferably structurally bonded between first skin 202 and second skin 210. In addition, solid inserts 208 are joined between first skin 202 and second skin 210 and are preferably structurally bonded between first skin 202 and second skin 210. Also, if adhesive has been placed between adjacent portions of solid inserts 208 and large cell core sections 204, then solid inserts 208 are joined with large cell core sections 204 and are preferably structurally bonded with large cell core sections 204. In the illustrated embodiment, step 114 involves co-curing of solid inserts 208 and large cell core sections 204 with first skin 202 and second skin 210.

Once panel assembly 212 is cured, first skin 202, large cell core sections 204, solid inserts 208 and second skin 210 may be referred to as a large cell core stiffened panel 214 having solid inserts 208, which may also be represent by FIG. 4D. Importantly, the solid inserts 208 provide a load path between first skin 202 and second skin 210. In addition, solid inserts 208 provide a large bonding surface for joining with first skin 202 and second skin 210 which reduces to potential for first skin 202 and/or second skin 210 from peeling away from large cell core sections 204. In certain implementations, solid inserts 208 may provide a fluid barrier to limit fluid intrusion, such as fuel, water and hydraulic fluid into large cell core sections 204.

Figure 4E:
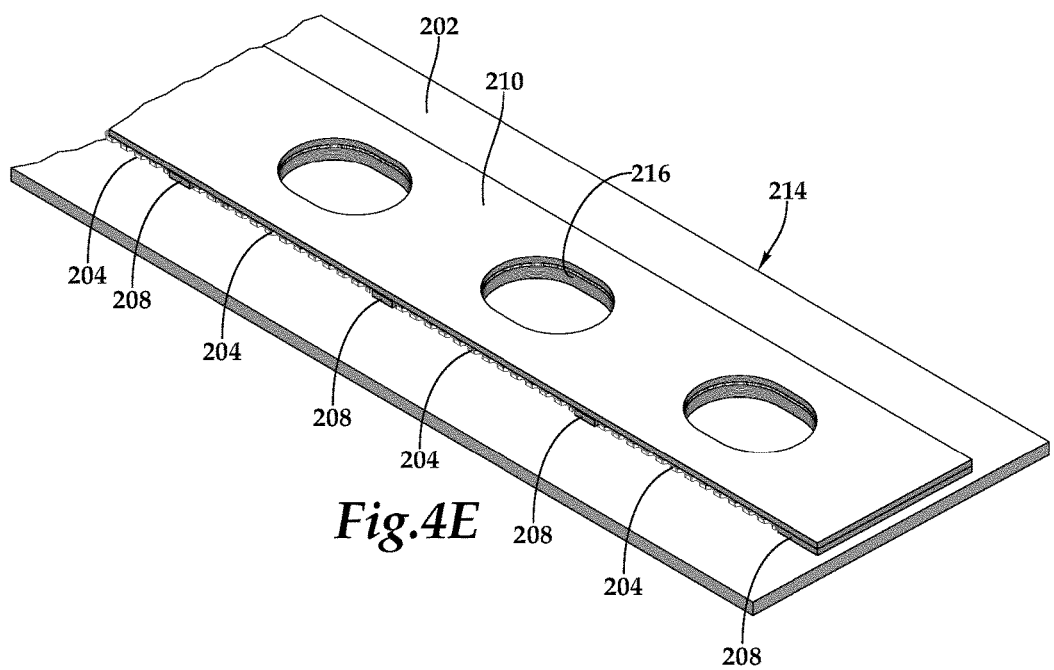
Figure 4F:
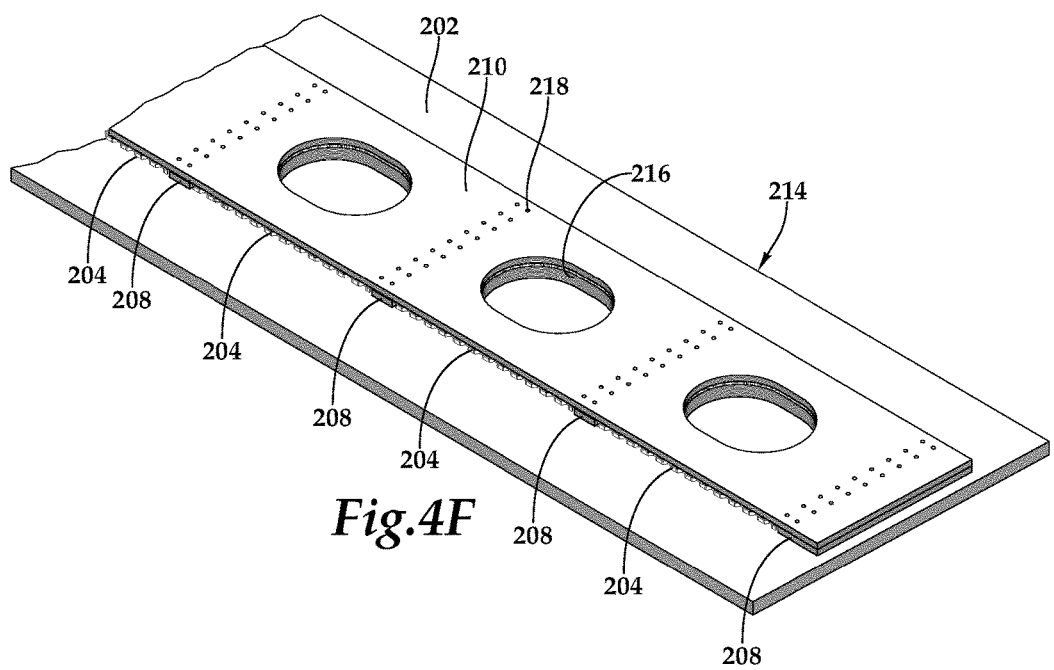
Figure 6A:
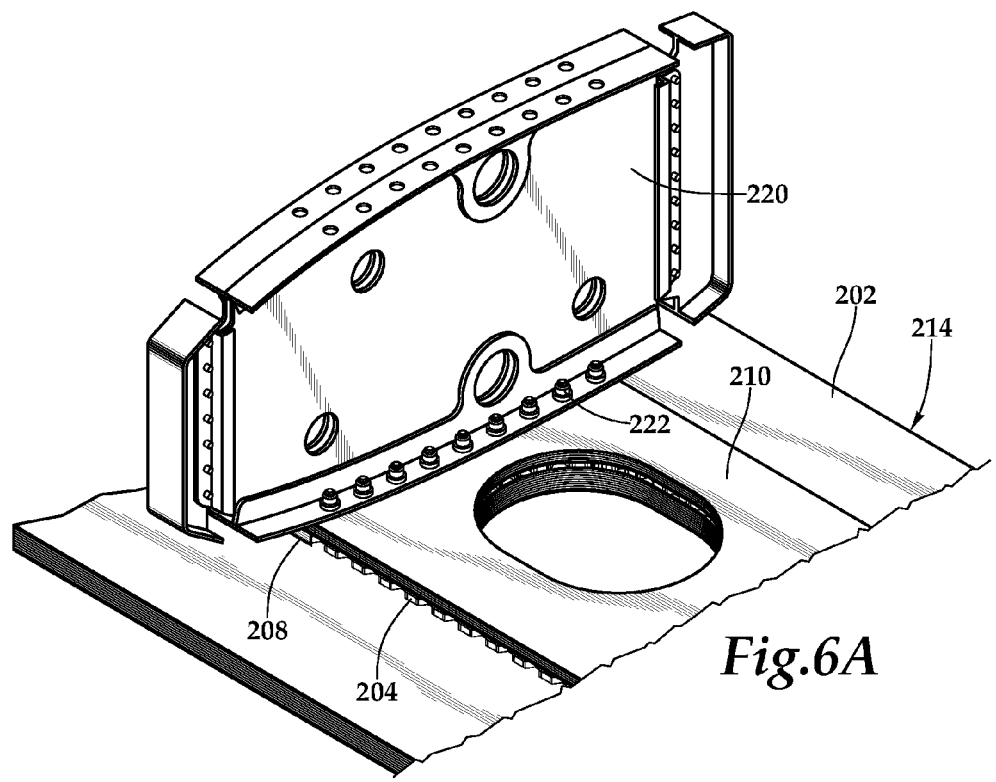
FIGS. 6A-6B are schematic illustrations of a wing rib joined to a wing skin formed from a large cell core stiffened panel having solid inserts in accordance with embodiments of the present disclosure.
Figure 6B:
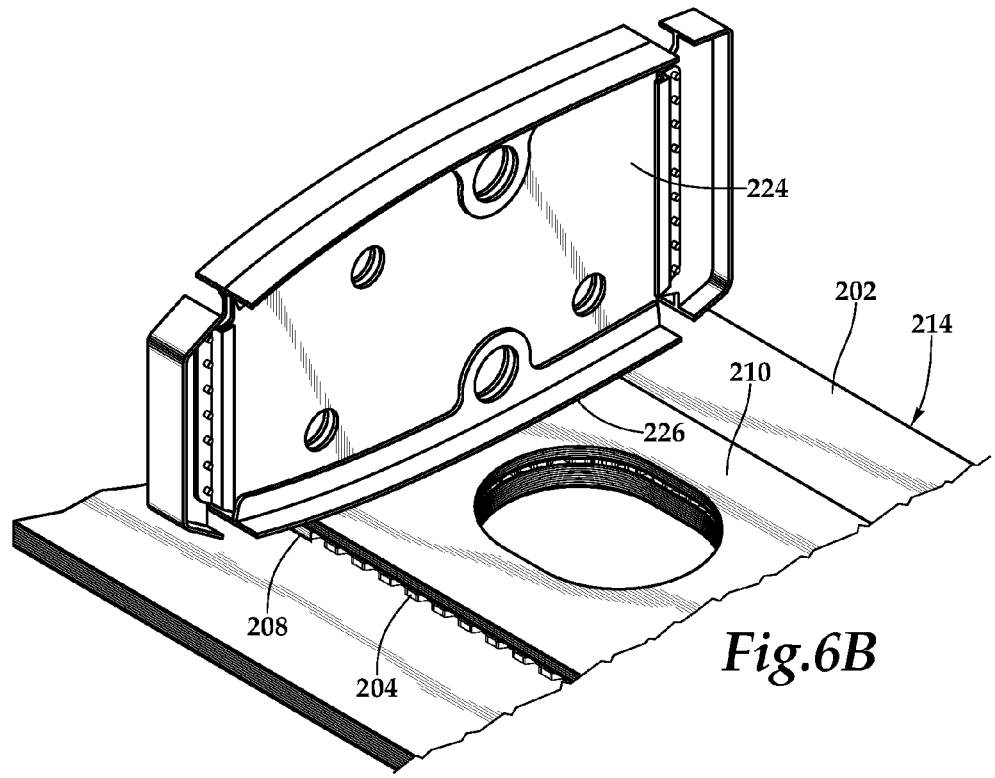

Based upon the intended implementation for large cell core stiffened panel 214, additional finishing steps may be desired. In the illustrated embodiment wherein large cell core stiffened panel 214 is a lower wing skin assembly, step 116 includes machining or otherwise removing cutouts 216 to provide fuel cell access, as best seen in FIG. 4E. In addition, as best seen in FIG. 4F, a plurality of holes 218 may be drilled through first skin 202, solid inserts 208 and second skin 210 to provide joining locations for coupling other airframe components to large cell core stiffened panel 214. For example, as best seen in FIG. 6A, a wing rib 220 is joined to large cell core stiffened panel 214 such that wing rib 220 is opposite a solid insert 208. As illustrated, wing rib 220 is joined to large cell core stiffened panel 214 using a plurality of aerospace fasteners 222 such as pins, screws, rivets or other suitable fastening means that extend through holes 218. Thus, the load applied to large cell core stiffened panel 214 by wing rib 220 during operation of aircraft 10 is received at a solid insert 208, which is an ultra stiff load point within large cell core stiffened panel 214. Alternatively, as best seen in FIG. 6B, an adhesive joint 226 is disposed between wing rib 224 and large cell core stiffened panel 214 such that a lower surface of wing rib 224 is structurally bonded to an upper surface of large cell core stiffened panel 214. As illustrated, wing rib 224 is joined to large cell core stiffened panel 214 such that wing rib 224 is opposite a solid insert 208. Thus, the load applied to large cell core stiffened panel 214 by wing rib 224 during operation of aircraft 10 is received at a solid insert 208, which is an ultra stiff load point within large cell core stiffened panel 214.

It is noted that the use of large cell core stiffened panels 214 as upper wing skin 58 and lower wing skin 56 of torque box structure 50 advantageously provides a narrow profile for the large cell core stiffened wing skin that does not include any or require any conventional stringers, thereby providing improved fuel bay clearance. In addition, the use of large cell core stiffened panels 214 as upper wing skin 58 and lower wing skin 56 improves the strength of torque box structure 50 including improved stiffness and torsional support during the shearing motion produced by proprotors 24a, 24b. The use of large cell core stiffened panels 214 results in a lower cost for manufacturing torque box structure 50 due to reduced tooling and labor requirements, a reduction in the part count and less intricate installation procedures such as a reduction in foam fillet installation. Further, the use of large cell core stiffened panels 214 as upper wing skin 58 and lower wing skin 56 reduces the number of quality defects as compared to prior art implementations.

Figure 7A:
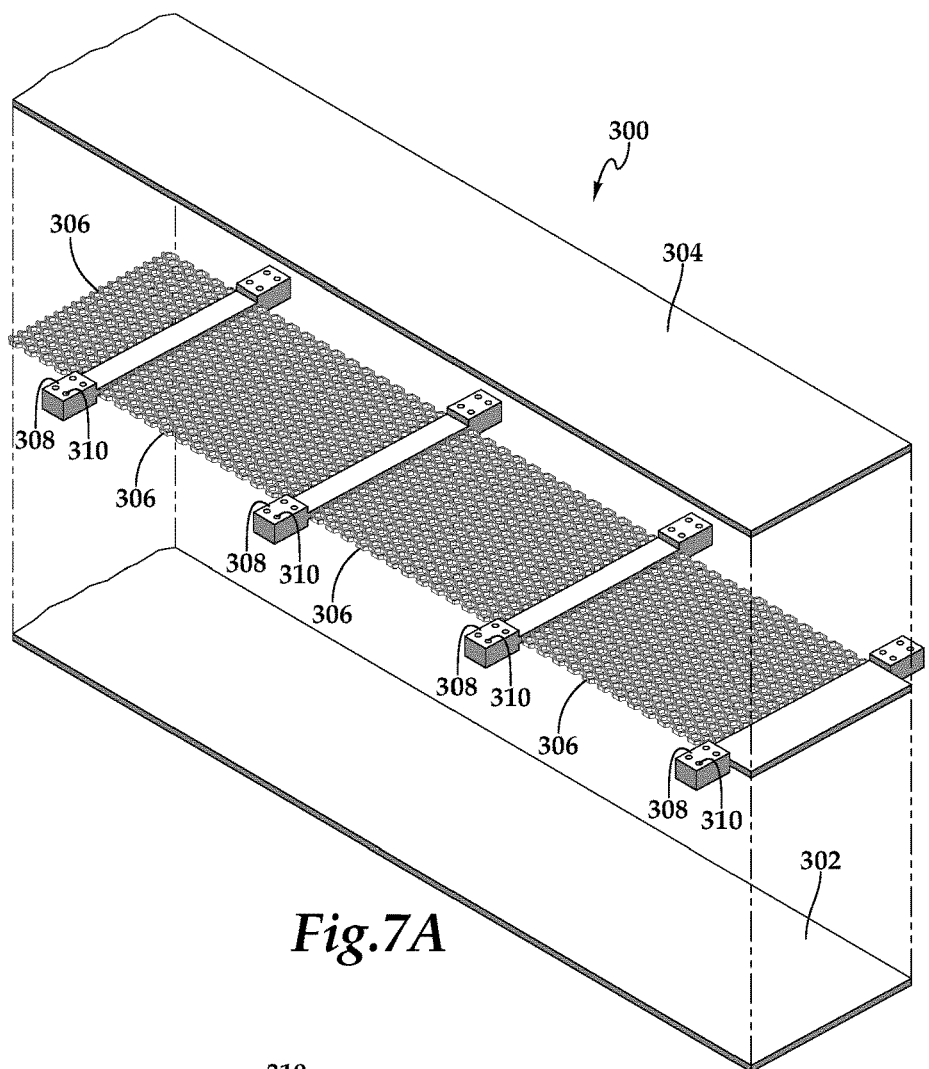
FIGS. 7A-7B are schematic illustrations of a large cell core stiffened panel having solid inserts in accordance with embodiments of the present disclosure.
Figure 7B:
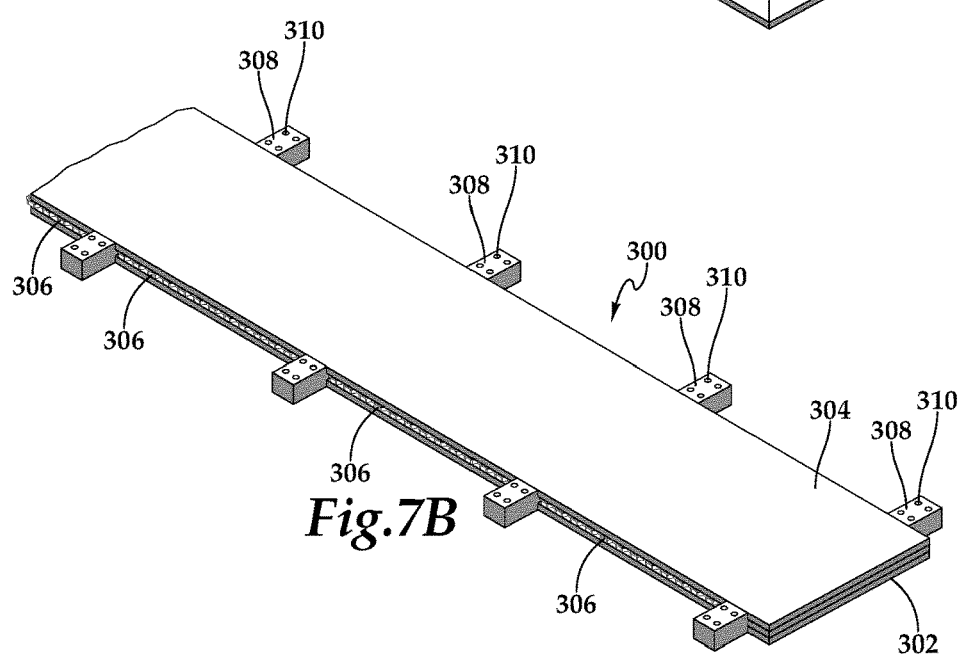

Referring next to FIGS. 7A-7B, therein is depicted a large cell core stiffened panel having solid inserts that is generally designated 300. Panel 300 includes a first skin 302 and a second skin 304 that are preferably laminates formed from a plurality of material plies as discussed herein. A plurality of large cell core sections 306 are joined between first skin 302 and second skin 304 and are preferably structurally bonded between first skin 302 and second skin 304 as discussed herein. Large cell core sections 306 are preferably composite honeycomb structures as discussed herein. A plurality of solid inserts 308 are joined between first skin 302 and second skin 304 and are preferably structurally bonded between first skin 302 and second skin 304 as discussed herein. Solid inserts 308 are preferably composite and/or compression molded inserts as discussed herein that have generally matching coefficients of thermal expansion with first skin 302 and second skin 304. In the illustrated embodiment, solid inserts 308 extend outwardly beyond the side surfaces of first skin 302 and second skin 304. In addition, the outwardly extending ends of solid inserts 308 are enlarged such that the upper and lower surfaces of the outwardly extending ends of solid inserts 308 are generally flush with the lower surface of first skin 302 and the upper surface of second skin 304. Each of the outwardly extending ends of solid inserts 308 includes a plurality of holes 310 to provide joining locations for coupling other components to large cell core stiffened panel 300.

Figure 8A:
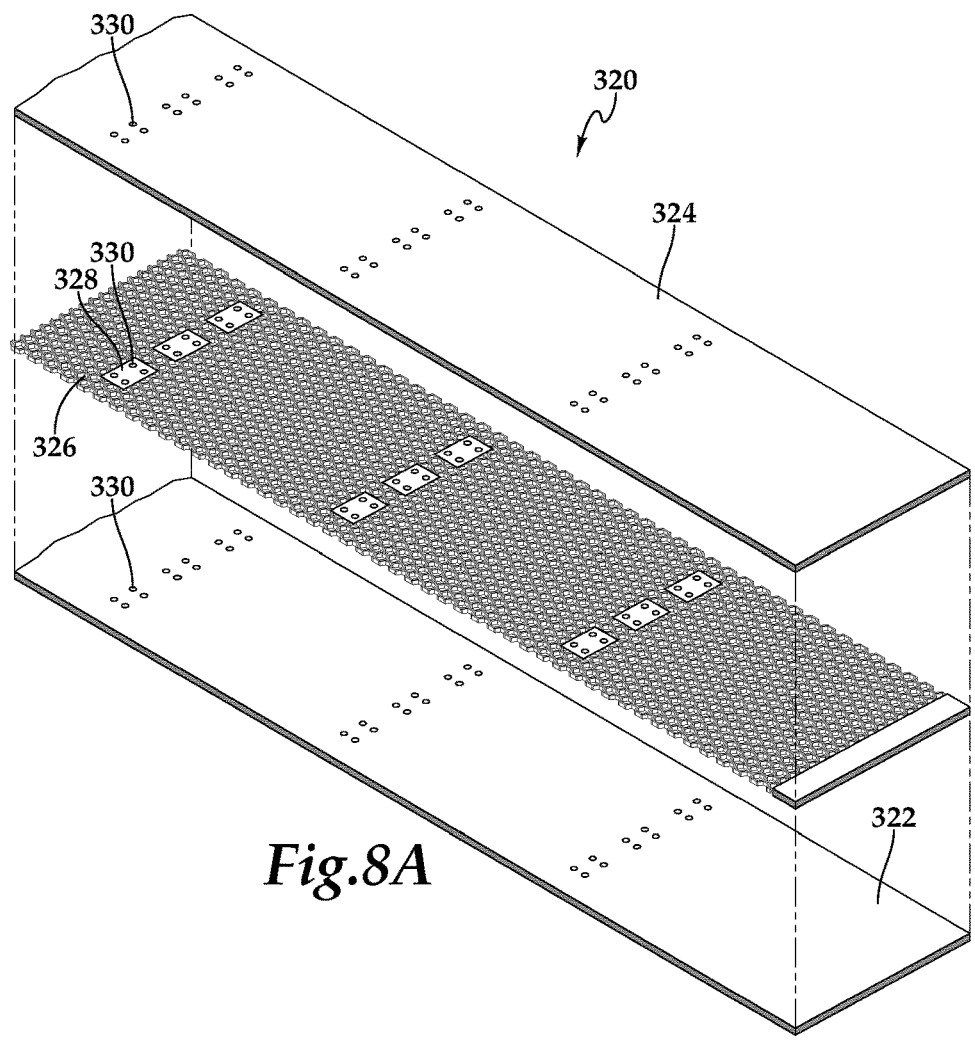
FIGS. 8A-8B are schematic illustrations of a large cell core stiffened panel having solid inserts in accordance with embodiments of the present disclosure.
Figure 8B:
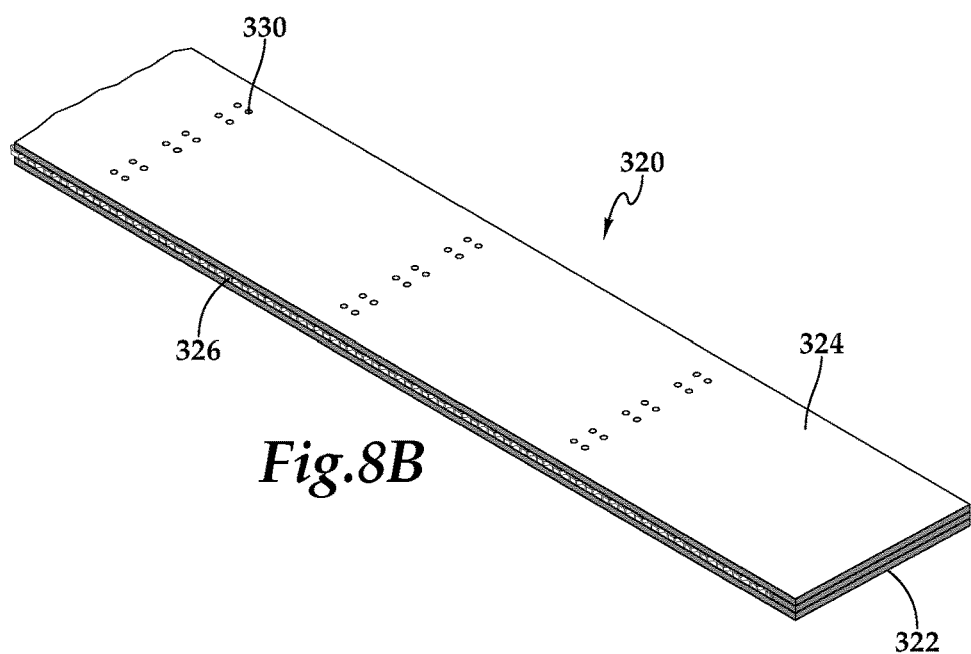

Referring next to FIGS. 8A-8B, therein is depicted a large cell core stiffened panel having solid inserts that is generally designated 320. Panel 320 includes a first skin 322 and a second skin 324 that are preferably laminates formed from a plurality of material plies as discussed herein. A large cell core section 326 is joined between first skin 322 and second skin 324 and is preferably structurally bonded between first skin 322 and second skin 324 as discussed herein. Large cell core section 326 is preferably a composite honeycomb structure as discussed herein. A plurality of solid inserts 328 are joined between first skin 322 and second skin 324 and are preferably structurally bonded between first skin 322 and second skin 324 as discussed herein. Solid inserts 328 are preferably composite and/or compression molded inserts as discussed herein that have generally matching coefficients of thermal expansion with first skin 322 and second skin 324. In the illustrated embodiment, each of solid inserts 328 is positioned within a cutout of large cell core section 326 and is fully surrounded by large cell core section 326. In addition, the side surfaces of each solid insert 328 may be joined with and/or structurally bonded to the adjacent portions of large cell core section 326. First skin 322, solid inserts 328 and second skin 324 include a plurality of holes 330 to provide joining locations for coupling other components to large cell core stiffened panel 320.

Figure 9A:
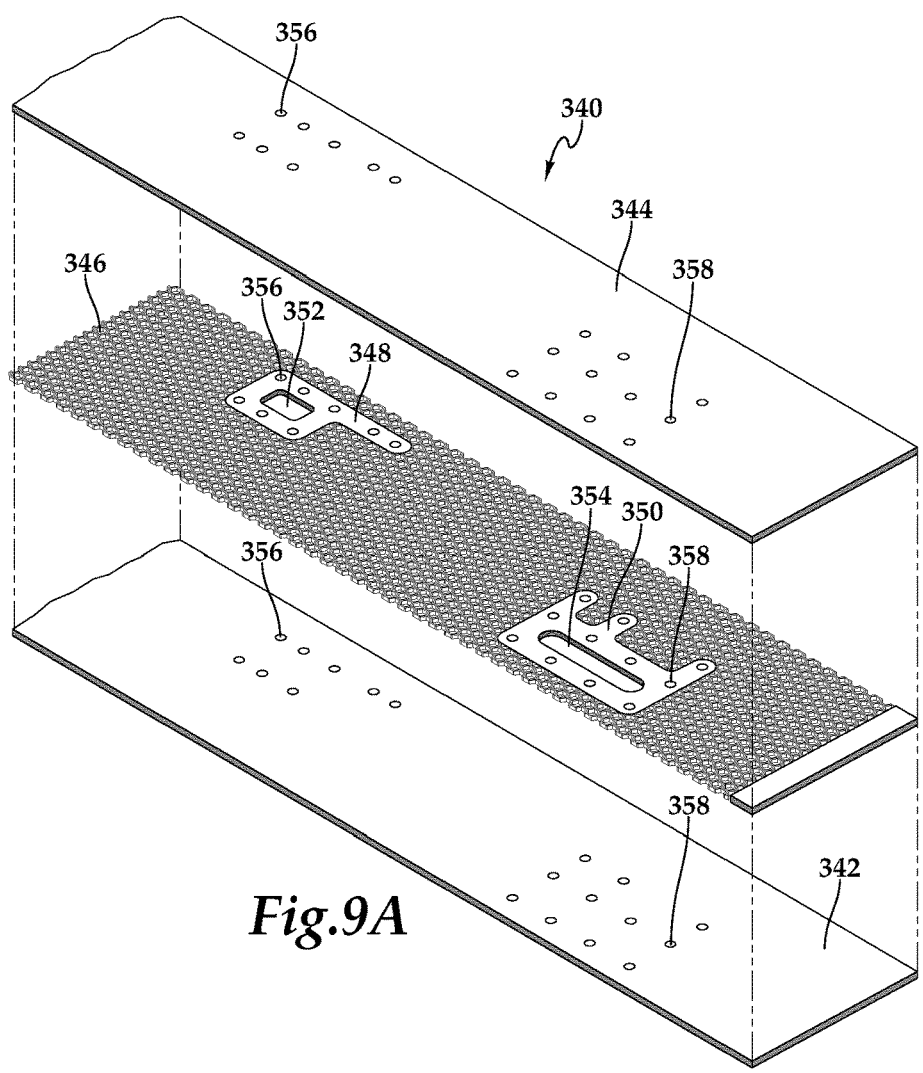
FIGS. 9A-9B are schematic illustrations of a large cell core stiffened panel having solid inserts in accordance with embodiments of the present disclosure.
Figure 9B:
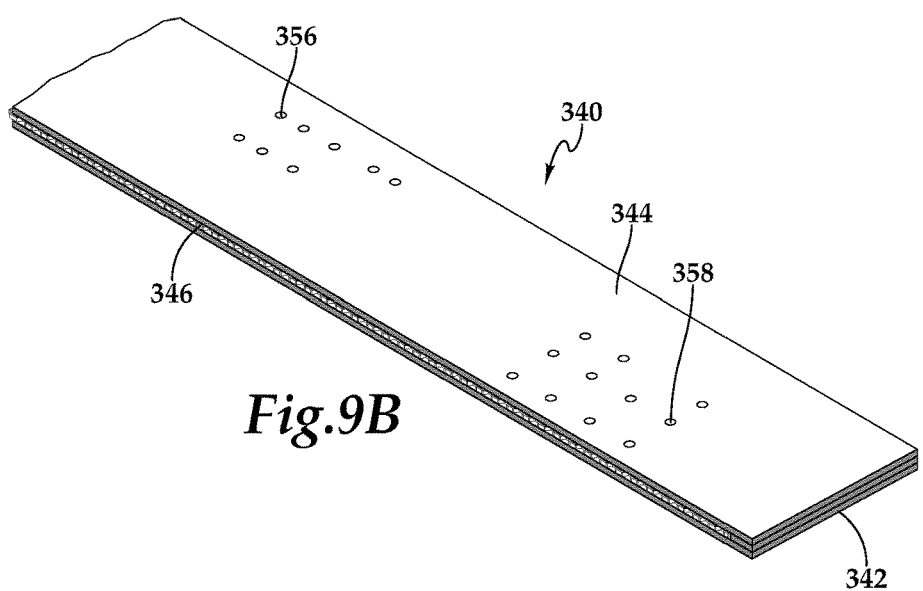

Even though the solid inserts of the present disclosure have been depicted as symmetric solid inserts, it should be understood by those having ordinary skill in the art that the solid inserts of the present disclosure could have any shape including non symmetric shapes. For example, as best seen in FIGS. 9A-9B, a large cell core stiffened panel 340 includes non symmetric solid inserts. Panel 340 includes a first skin 342 and a second skin 344 that are preferably laminates formed from a plurality of material plies as discussed herein. A large cell core section 346 is joined between first skin 342 and second skin 344 and is preferably structurally bonded between first skin 342 and second skin 344 as discussed herein. Large cell core section 346 is preferably a composite honeycomb structure as discussed herein. Solid inserts 348, 350 are joined between first skin 342 and second skin 344 and are preferably structurally bonded between first skin 342 and second skin 344 as discussed herein. Solid inserts 348, 350 are preferably composite and/or compression molded inserts as discussed herein that have generally matching coefficients of thermal expansion with first skin 342 and second skin 344. In the illustrated embodiment, each of solid inserts 348, 350 is positioned within a cutout of large cell core section 346 and is fully surrounded by large cell core section 346 such that the outer surfaces of solid inserts 348, 350 may be joined with and/or structurally bonded to the adjacent portions of large cell core section 346. Solid insert 348 includes a central void 352 and solid insert 350 includes a central void 354 that enable reduction in the weight of solid inserts 348, 350. First skin 342, solid insert 348 and second skin 344 include a plurality of holes 356 to provide joining locations for coupling other components to large cell core stiffened panel 340. Likewise, first skin 342, solid insert 350 and second skin 344 include a plurality of holes 358 to provide joining locations for coupling other components to large cell core stiffened panel 340.

Figure 10A:
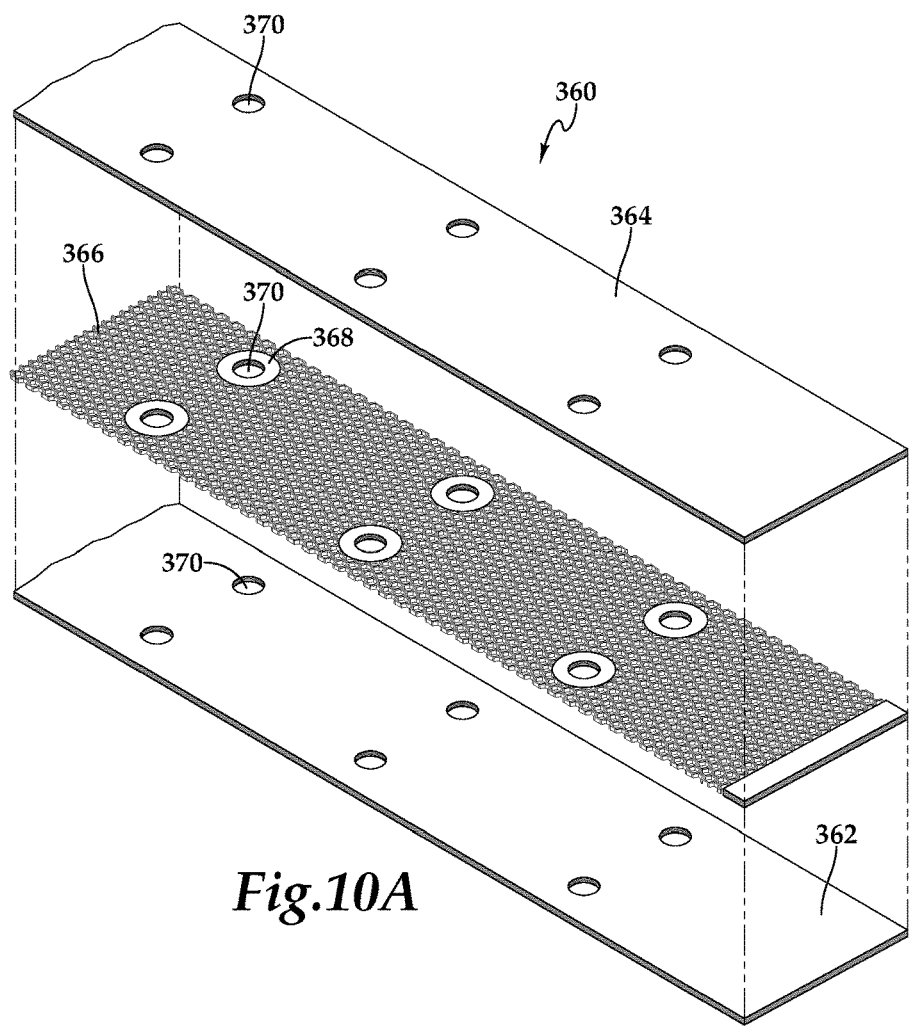
FIGS. 10A-10B are schematic illustrations of a large cell core stiffened panel having solid inserts in accordance with embodiments of the present disclosure.
Figure 10B:
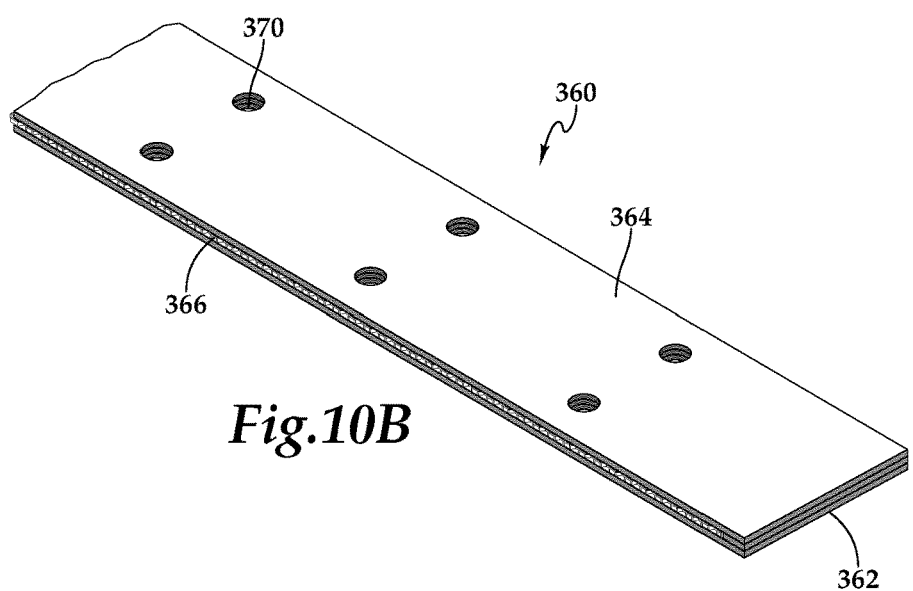

Referring next to FIGS. 10A-10B, therein is depicted a large cell core stiffened panel having solid inserts that is generally designated 360. Panel 360 includes a first skin 362 and a second skin 364 that are preferably laminates formed from a plurality of material plies as discussed herein. A large cell core section 366 is joined between first skin 362 and second skin 364 and is preferably structurally bonded between first skin 362 and second skin 364 as discussed herein. Large cell core section 366 is preferably a composite honeycomb structure as discussed herein. A plurality of solid inserts 368 are joined between first skin 362 and second skin 364 and are preferably structurally bonded between first skin 362 and second skin 364 as discussed herein. Solid inserts 368 are preferably composite and/or compression molded inserts as discussed herein that have generally matching coefficients of thermal expansion with first skin 362 and second skin 364. In the illustrated embodiment, each of solid inserts 368 is positioned within a cutout of large cell core section 366 and is fully surrounded by large cell core section 366. In addition, the side surfaces of each solid insert 368 may be joined with and/or structurally bonded to the adjacent portions of large cell core section 366. In the illustrated embodiment, solid insert 368 each include a pass through opening 370 which may be preformed in solid inserts 368 or formed together with corresponding portions of pass through openings 370 in first skin 362 and second skin 364. Pass through openings 370 may provide locations for fluid lines, electrical lines, data cables or the like to pass through panel 360.

Figure 11A:
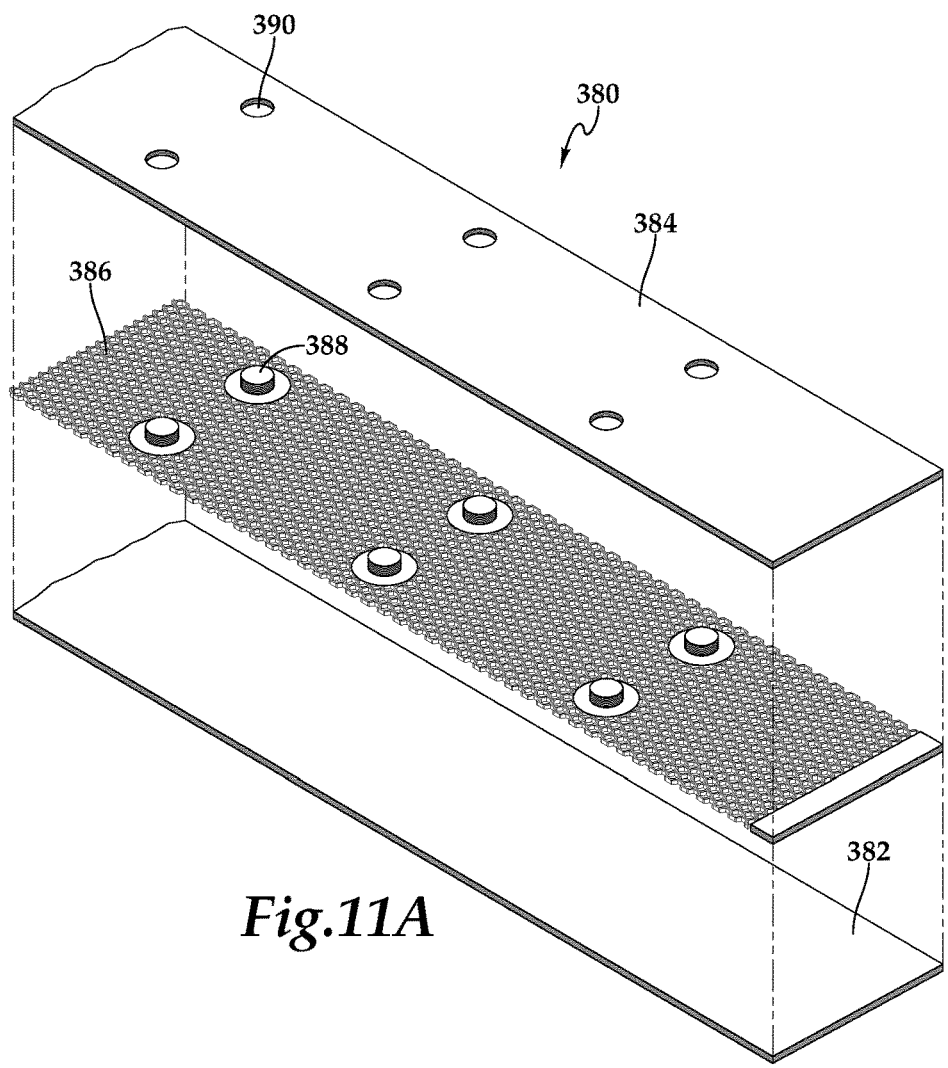
FIGS. 11A-11B are schematic illustrations of a large cell core stiffened panel having solid inserts in accordance with embodiments of the present disclosure.
Figure 11B:
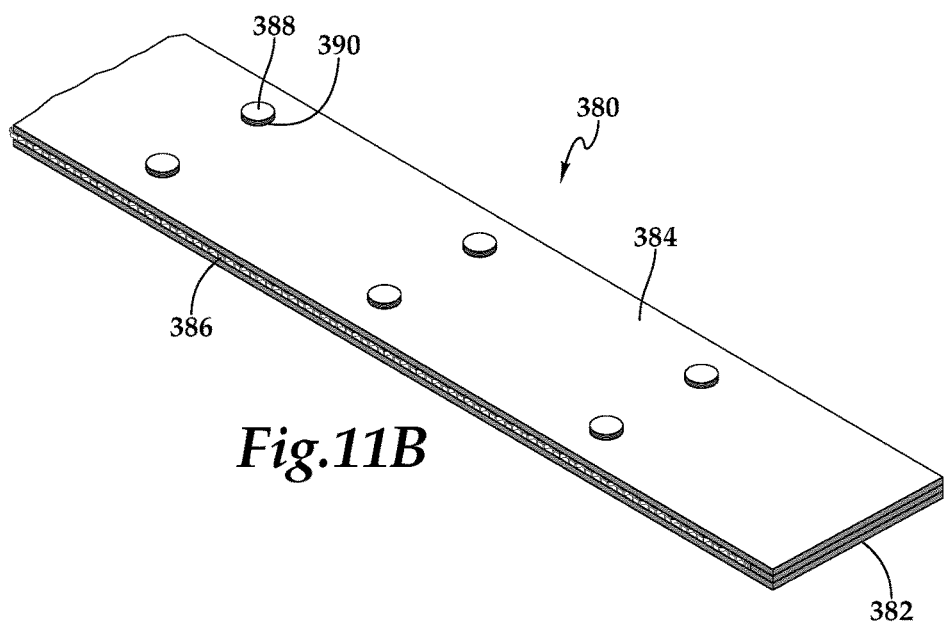

Referring next to FIGS. 11A-11B, therein is depicted a large cell core stiffened panel having solid inserts that is generally designated 380. Panel 380 includes a first skin 382 and a second skin 384 that are preferably laminates formed from a plurality of material plies as discussed herein. A large cell core section 386 is joined between first skin 382 and second skin 384 and is preferably structurally bonded between first skin 382 and second skin 384 as discussed herein. Large cell core section 386 is preferably a composite honeycomb structure as discussed herein. A plurality of solid inserts 388 are joined to first skin 382 and second skin 384 and are preferably structurally bonded to first skin 382 and second skin 384 as discussed herein. Solid inserts 388 are preferably composite and/or compression molded inserts as discussed herein that have generally matching coefficients of thermal expansion with first skin 382 and second skin 384. In the illustrated embodiment, each of solid inserts 388 is positioned within a cutout of large cell core section 386 and is fully surrounded by large cell core section 386. In addition, the side surfaces of each solid insert 388 may be joined with and/or structurally bonded to the adjacent portions of large cell core section 386. In the illustrated embodiment, solid insert 388 each include a cylindrical extension that passes through a precut opening 390 in second skin 384 such that the side surfaces of each cylindrical extension may be joined with and/or structurally bonded to the adjacent side surfaces of openings 390. The cylindrical extensions may provide joining locations for coupling other components to large cell core stiffened panel 380.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An airframe assembly for an aircraft comprising:
   a first airframe member having a first skin, a second skin, a plurality of large cell core sections and a plurality of solid inserts, the large cell core sections and the solid inserts structurally bonded between the first and second skins and structurally bonded together;
   a second airframe member having a first skin, a second skin, a plurality of large cell core sections and a plurality of solid inserts, the large cell core sections and the solid inserts structurally bonded between the first and second skins and structurally bonded together;
   a plurality of ribs disposed between the first and second airframe members; and
   a plurality of adhesive joints each disposed between one of the ribs and one of the first and second airframe members structurally bonding each of the ribs between the first and second airframe members such that each of the ribs is structurally bonding to the first airframe member opposite one of the solid inserts and structurally bonding to the second airframe member opposite one of the solid inserts.

2. The airframe assembly as recited in claim 1 wherein each of the first and second skins further comprises a composite laminate skin.

3. The airframe assembly as recited in claim 1 wherein the large cell core sections are selected from the group consisting of large cell composite cores and large cell carbon cores.

4. The airframe assembly as recited in claim 1 wherein the first skins, the second skins and the solid inserts further comprise a material selected from the group consisting of composite materials and carbon composite materials.

5. The airframe assembly as recited in claim 1 wherein the first skins, the second skins and the solid inserts have substantially matching coefficients of thermal expansion.

6. The airframe assembly as recited in claim 1 wherein the first skin, the second skin, the plurality of large cell core sections and the plurality of solid inserts of the first airframe member are co-cured together and wherein the first skin, the second skin, the plurality of large cell core sections and the plurality of solid inserts of the second airframe member are co-cured together.

7. The airframe assembly as recited in claim 1 wherein each of the ribs is substantially parallel with the oppositely disposed solid insert of the first airframe member and with the oppositely disposed solid insert of the second airframe member.

8. A wing assembly for an aircraft comprising:
   an upper wing member having an outer skin, an inner skin, a plurality of large cell core sections and a plurality of solid inserts, the large cell core sections and the solid inserts structurally bonded between the inner and outer skins and structurally bonded together;
   a lower wing member having an outer skin, an inner skin, a plurality of large cell core sections and a plurality of solid inserts, the large cell core sections and the solid inserts structurally bonded between the inner and outer skins and structurally bonded together;
   a plurality of wing ribs disposed between the upper and lower wing members; and
   a plurality of adhesive joints each disposed between one of the wing ribs and one of the upper and lower wing members structurally bonding each of the wing ribs between the upper and lower wing members such that each of the wing ribs is structurally bonding to the inner skin of the upper wing member opposite one of the solid inserts and structurally bonding to the inner skin of the lower wing member opposite one of the solid inserts.

9. The wing assembly as recited in claim 8 wherein each of the outer and inner skins further comprises a composite laminate skin.

10. The wing assembly as recited in claim 8 wherein the large cell core sections are selected from the group consisting of large cell composite cores and large cell carbon cores.

11. The wing assembly as recited in claim 8 wherein the inner skins, the outer skins and the solid inserts further comprise a material selected from the group consisting of composite materials and carbon composite materials.

12. The wing assembly as recited in claim 8 wherein the inner skins, the outer skins and the solid inserts have substantially matching coefficients of thermal expansion.

13. The wing assembly as recited in claim 8 wherein the outer skin, the inner skin, the plurality of large cell core sections and the plurality of solid inserts of the upper wing member are co-cured together and wherein the outer skin, the inner skin, the plurality of large cell core sections and the plurality of solid inserts of the lower wing member are co-cured together.

14. The wing assembly as recited in claim 8 wherein each of the wing ribs is substantially parallel with the oppositely disposed solid insert of the upper wing member and with the oppositely disposed solid insert of the lower wing member.

15. An aircraft comprising:
   a first airframe member having a first skin, a second skin, a plurality of large cell core sections and a plurality of solid inserts, the large cell core sections and the solid inserts structurally bonded between the first and second skins and structurally bonded together;
   a second airframe member having a first skin, a second skin, a plurality of large cell core sections and a plurality of solid inserts, the large cell core sections and the solid inserts structurally bonded between the first and second skins and structurally bonded together;
   a plurality of ribs disposed between the first and second airframe members; and
   a plurality of adhesive joints each disposed between one of the ribs and one of the first and second airframe members structurally bonding each of the ribs between the first and second airframe members such that each of the ribs is structurally bonding to the first airframe member opposite one of the solid inserts and structurally bonding to the second airframe member opposite one of the solid inserts.

16. The aircraft as recited in claim 15 wherein each of the first and second skins further comprises a composite laminate skin.

17. The aircraft as recited in claim 15 wherein the large cell core sections are selected from the group consisting of large cell composite cores and large cell carbon cores.

18. The aircraft as recited in claim 15 wherein the first skins, the second skins and the solid inserts further comprise a material selected from the group consisting of composite materials and carbon composite materials.

19. The aircraft as recited in claim 15 wherein the first skins, the second skins and the solid inserts have substantially matching coefficients of thermal expansion.

20. The aircraft as recited in claim 15 wherein the first skin, the second skin, the plurality of large cell core sections and the plurality of solid inserts of the first airframe member are co-cured together and wherein the first skin, the second skin, the plurality of large cell core sections and the plurality of solid inserts of the second airframe member are co-cured together.

21. The aircraft as recited in claim 15 wherein each of the ribs is substantially parallel with the oppositely disposed solid insert of the first airframe member and with the oppositely disposed solid insert of the second airframe member.

* * * * *